United States Patent
Goodfellow et al.

(10) Patent No.: US 7,900,985 B2
(45) Date of Patent: Mar. 8, 2011

(54) LOAD SECURING EXTENSION ARM

(76) Inventors: Carle Robert Goodfellow, Kiama (AU); Linda Rae Goodfellow, Kiama (AU)

( * ) Notice: Subject to any disclaimer, the term of this patent is extended or adjusted under 35 U.S.C. 154(b) by 108 days.

(21) Appl. No.: 12/330,408

(22) Filed: Dec. 8, 2008

(65) Prior Publication Data
US 2009/0274530 A1    Nov. 5, 2009

(30) Foreign Application Priority Data
Apr. 30, 2008    (AU) ................. 2008902133

(51) Int. Cl.
*B25J 1/00* (2006.01)
(52) U.S. Cl. ........................ 294/19.1; 294/104
(58) Field of Classification Search ............... 294/19.1, 294/22, 24, 50.9, 104; 410/99
See application file for complete search history.

(56) References Cited

U.S. PATENT DOCUMENTS

| | | | |
|---|---|---|---|
| 48,665 A * | 7/1865 | Driesslein | 294/50.9 |
| 243,043 A * | 6/1881 | Hemme | 294/50.9 |
| 868,094 A * | 10/1907 | Jerkins | 294/29 |
| 1,751,481 A * | 3/1930 | La Tourrette | 294/50.9 |
| 1,846,968 A * | 2/1932 | Kablanow | 294/19.1 |
| 1,945,311 A * | 1/1934 | Gustafson | 294/50.9 |
| 3,264,028 A * | 8/1966 | Rasmussen | 294/19.1 |
| 4,160,563 A * | 7/1979 | Whitney | 294/19.1 |
| 4,260,186 A * | 4/1981 | Sky-Eagle, Jr. | 294/19.1 |
| 5,192,104 A * | 3/1993 | Lin | 294/19.1 |
| 6,068,311 A * | 5/2000 | Jones | 294/1.4 |
| 6,669,254 B2 * | 12/2003 | Thom et al. | 294/19.1 |
| 6,820,906 B1 * | 11/2004 | McClendon | 294/19.1 |

* cited by examiner

*Primary Examiner* — Dean J Kramer
(74) *Attorney, Agent, or Firm* — Whitham, Curtis, Christofferson & Cook, P.C.

(57) ABSTRACT

A tie down positioning, load securing extension arm (1.012) including an angle protector gripping head (1.016), a shaft (1.017) and a handle (1.014), wherein the head includes first and second sets of opposed jaws (1.022, 1.014) adapted to grip an angle protector (1.030), the first set of jaws having a first set of engagement elements (4.041, 4.043), the first set of engagement elements being spaced apart transversely to the arm or shaft, wherein the head further includes a tie down guide (4.020, 4.021), which, in use is adapted to facilitate placement of an angle protector and a tie down to secure, for example, a load on a vehicle.

9 Claims, 5 Drawing Sheets

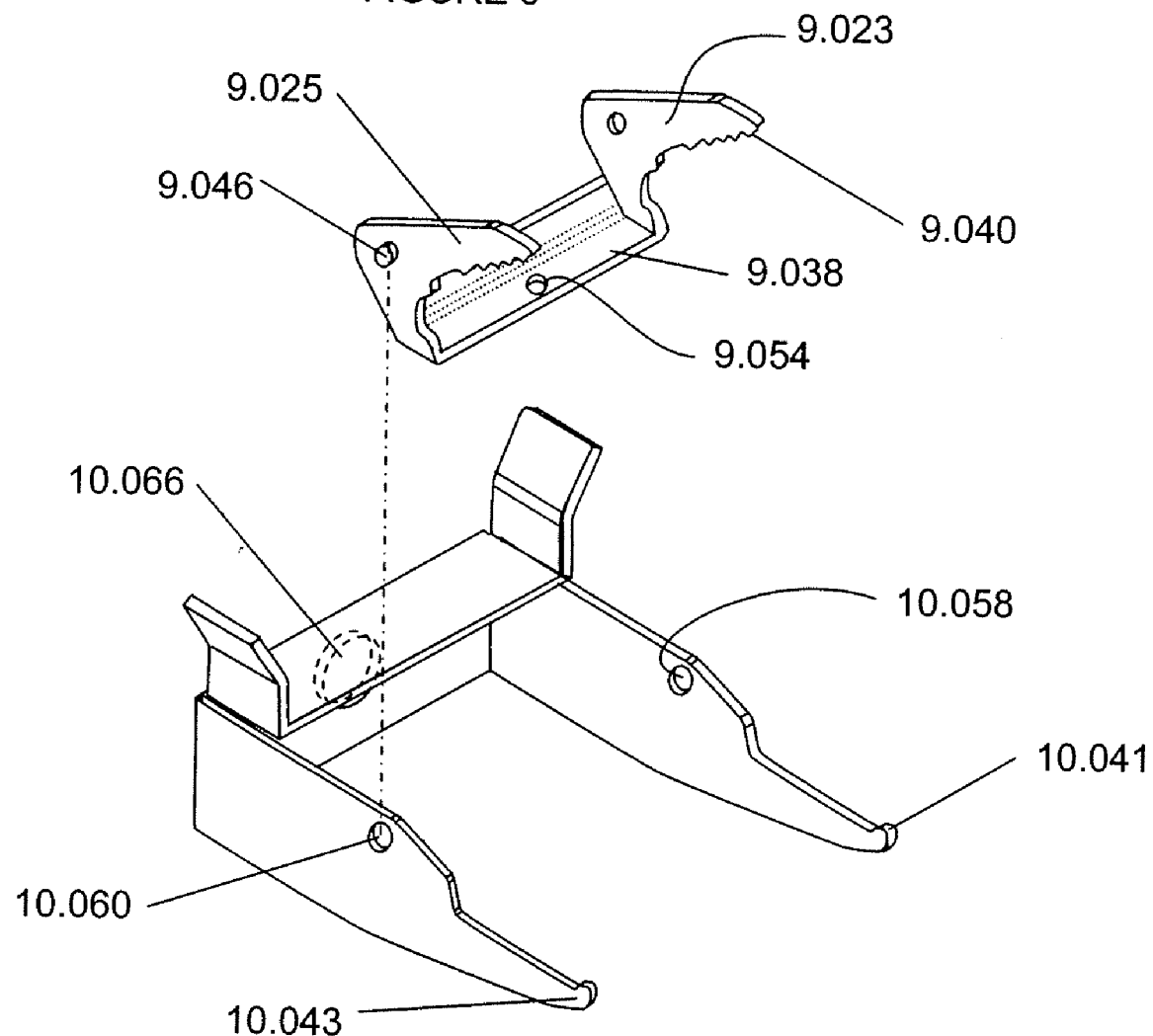

LOAD SECURING EXTENSION ARM

FIELD OF THE INVENTION

This invention relates to a load securing extension arm.

The invention is particularly suited for locating load straps or chins over cargo protection angles.

BACKGROUND OF THE INVENTION

Lorry loads are usually required by law to be tied down. However, the tie downs, such as chains, straps or ropes exert significant force on the corners of the loads, and this can damage the load. Thus corner protection angles are used to protect the load. In the past, it has been customary for the lorry driver to climb on to the tray of the lorry to place the protectors on the load and to place the tie down over the protectors. When the driver has located the tie down over the protectors he would then jump from the lorry tray to the ground. This carries the risk of injury from falling or from impact with the ground. An alternative method of mounting onto the tray and dismounting therefrom was devised using a set of mobile steps, so the driver could mount and dismount from the tray. However, the use of these steps is time consuming.

SUMMARY OF THE INVENTION

According to an embodiment of the invention, there is provided a tie down positioning extension arm including a protector gripping head, a shaft and a handle, wherein the head includes first and second sets of opposed jaws adapted to grip an angle protector, wherein the head includes a tie down guide.

The gripping head can include a pair of spring biassed jaws.

The jaws can be biased closed.

The handle can include an operating lever connected via an operating rod or cable to the jaws.

The underside of the lower jaws can be inclined to the shaft to facilitate removing the tool after a protector angle has be positioned. An attachment arrangement for a shaft with internal activation rod;
the arrangement including a first shaft element having a first rod member axially movable therein;
a first attachment member affixed to the end of the first rod member;
a second shaft element having a second rod member axially movable therein;
the second rod member having a second attachment affixed to the end of the second rod member;
the first and second attachment members being adapted to releasably connect the first rod member and the second rod member to enable axial movement to be imparted between the first and second rod members;
and a connection arrangement adapted to releasably hold the first and second shaft members.

The second attachment member can include a boss, and the first attachment member includes a cavity having a radial access slot adapted to permit the boss and second rod to pass through the slot so the boss lies within the cavity.

The invention also provides a method of tying down a load including the steps of:
attaching a first end of a tie down to an attachment point on a first side of a lorry;
throwing the free end of the tie down over the load;
gripping a first angle protector with an extension arm as claimed in any one of the preceding claims;
placing the first angle protector on the edge of the load under the tie down on the first side of the lorry;
placing a second angle protector on the edge of the load under the tie down on the second side of the lorry;
tensioning the tie down; and
fastening the free end of the tie down to a second attachment point on the second side of the lorry.

The method can include the steps of using the tie down guide to locate the tie down on the first and second angle protectors.

BRIEF DESCRIPTION OF THE DRAWINGS

An embodiment or embodiments of the present invention will now be described, by way of example only, with reference to the accompanying drawings, in which:

FIG. 9 illustrates a movable jaw according to an embodiment of the invention;

FIG. 10 illustrates a fixed jaw according to an embodiment of the invention;

Figure 1:
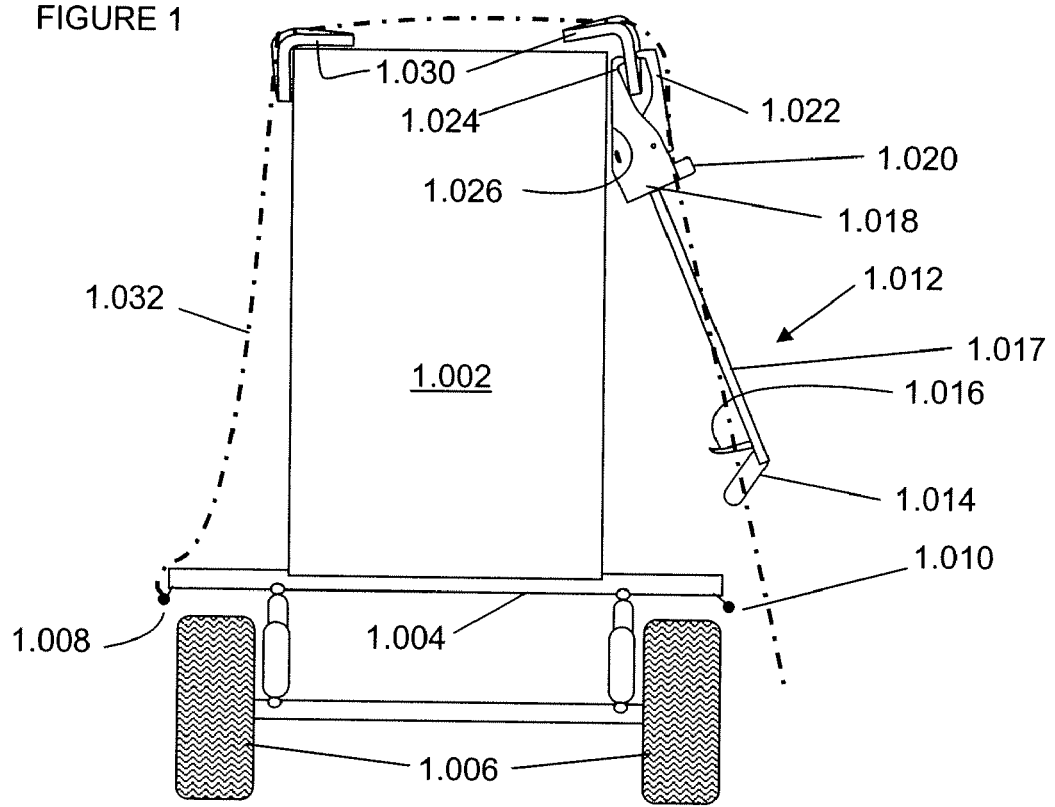
FIG. 1 is a schematic illustration of an extension arm in use.

The numbering convention used in the drawings is that the digits in front of the full stop indicate the drawing number, and the digits after the full stop are the element reference numbers. Where possible, the same element reference number is used in different drawings to indicate corresponding elements.

DETAILED DESCRIPTION OF THE EMBODIMENT OR EMBODIMENTS

The invention will be described with reference to the drawings.

FIG. 1 shows a load 1.002 on the tray 1.004 of a lorry. A tie down attachment rail 1.008, 1.010 runs along either side of the tray 1.004. Load protector angles 1.030 are used to protect the load from damage by the tie down chain, rope, or strap 1.032. The extension arm is shown generally at 1.012. The gripping head 1.018 is shown larger than actual scale to clearly illustrate relevant features.

In FIG. 1, a first protector angle is shown already in place on the left side of the load. A second protector angle is shown being placed in position with the aid of the extension arm 1.012.

The extension arm includes a hand grip 1.014, a lever 1.016, a hollow tubular rod 1.017, a grip head 1.018 with a set of jaws 1.022, 1.024 adapted to grip a protector angle 1.030. A tie down guide 1.020 is provided to enable the user to control the tie down and position it in the required location on the protector angle. The extension arm enables a protector angle to be placed in position while the user is standing on the ground.

As shown in FIG. 1, an angle 1.030 is gripped in the jaws and placed in position over an upper edge of the load 1.002. An operating rod (4.064 in FIG. 4) operatively connects the lever 1.016 to the movable jaw 1.022. The gripper jaws can be adapted to be normally held open by a spring and can be closed by the user operating the jaws via the lever 1.016, or the jaws can be adapted to operate such that they are normally closed with sufficient spring force to hold the protector angle, and the user can then release the jaws by operating the lever, 1.016. In the current embodiment, the first mode of operation is used. At least part of the lower edge 1.026 of the lower jaw can be angled to taper towards the end of the jaw to reduce interference with the action of releasing the angle.

Figure 2:
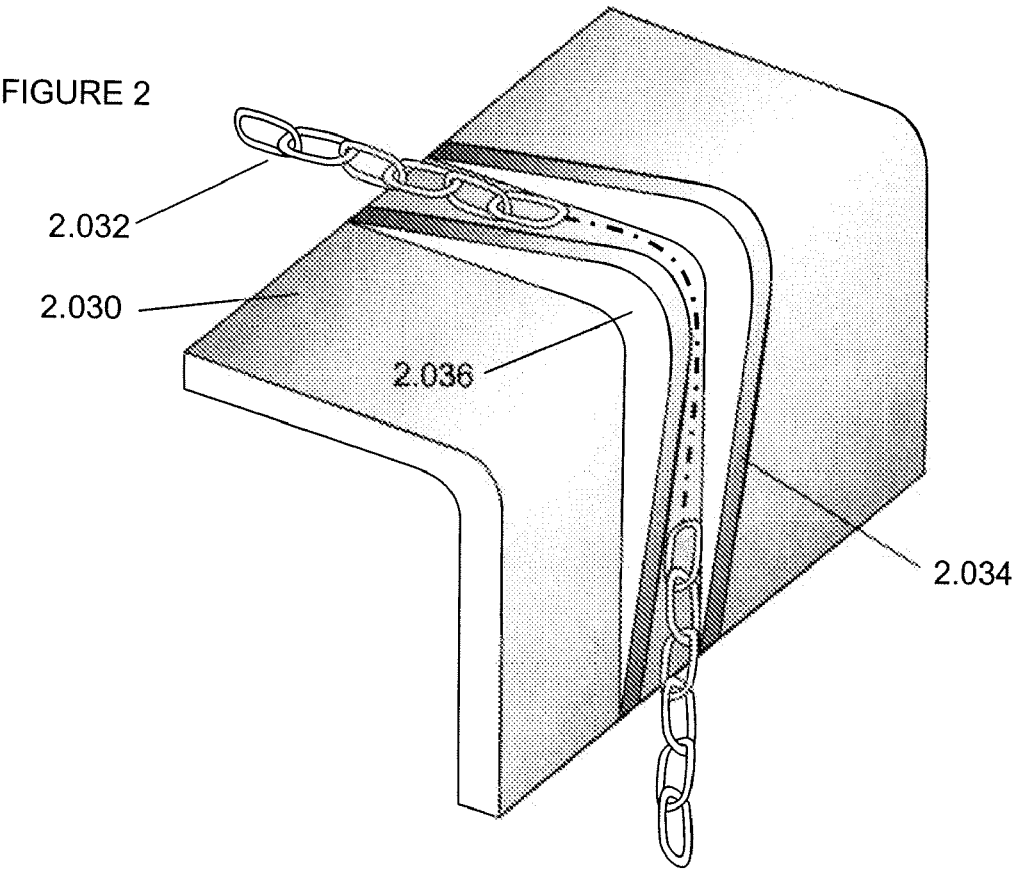
FIG. 2 is a schematic illustration of a load chain located on a load protector.

FIG. 2 shows detail of a tie down chain in place in a protector angle adapted for chain tie downs. The angle 1.030 includes a pair of raised ribs 2.034, 2.036 forming a chain guide therebetween to prevent the chain from slipping off the protector angle. Thus, when installing the protector guide under the tie down chain, it is necessary for the user to be able to manipulate the chain into place between the ribs 2.034, 2.036. The tie down guides, best shown at 4.020, 4.021 enable the user to manoeuvre the tie down into place while standing on the ground.

Figure 3:
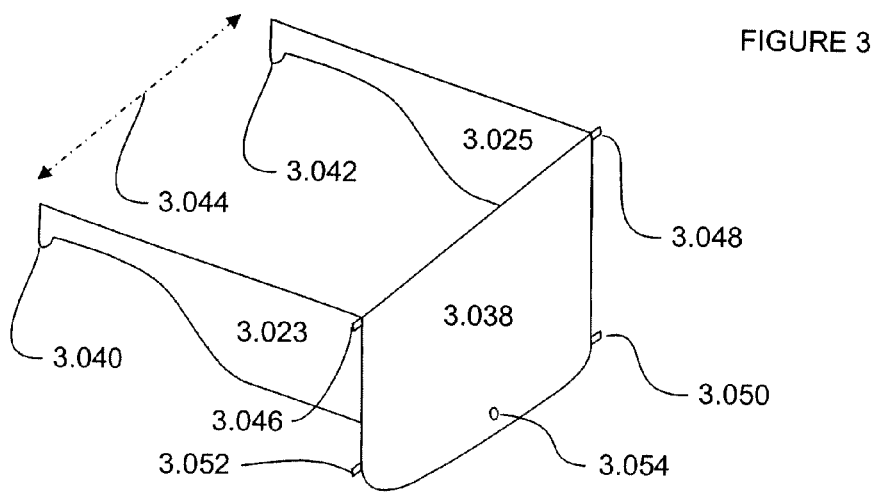
FIG. 3 illustrates a moveable jaw for an extension arm according to an embodiment of the invention.

FIG. 3 illustrates a set of movable jaws (upper jaws) adapted for use with the present invention. There are two arms 3.023, 3.025, extending from a base 3.038 and carrying jaws 3.040, 3.042. A pair of hinge projections 3.046, 3.048 project from the base, and a pair of guide projections 3.050, 3.052 also project from the base. An attachment hole 3.054 is provided to engage the end of the operating rod 4.064 so the user can manipulate the movable jaws.

The distance 3.044 between the jaws 3.040, 3.042 can be chosen to suit the features of the angle protector. For example, the upper jaws 3.040, 3.042 can be spaced apart sufficiently to grasp the angle protector 2.030 on either side of the ribs 2.034, 2.036.

In one embodiment, the upper jaws, arms, base, pivot pins, and guide pins can be formed integrally by stamping and forming sheet metal.

Alternatively, some of the components can be moulded.

Figure 4:
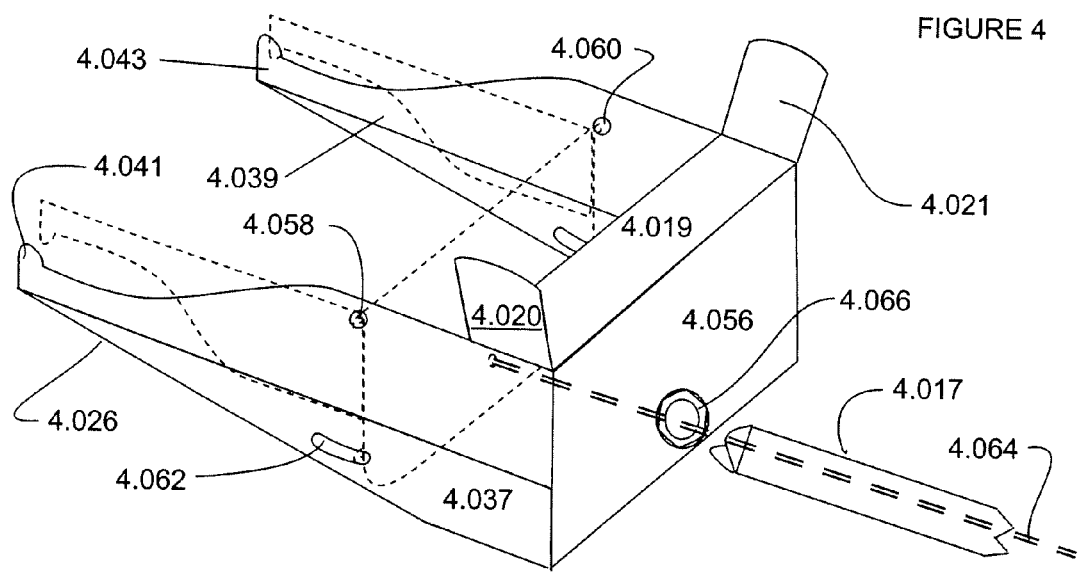
FIG. 4 illustrates a fixed jaw for an extension arm according to an embodiment of the invention.

FIG. 4 illustrates a set of fixed jaws (lower jaws) with the movable jaws superimposed in dashed outline. The fixed jaws have a base 4.056 from which a pair of arms, 4.037, 4.039 carrying jaws 4.041, 4.043 extend.

Figure 5:
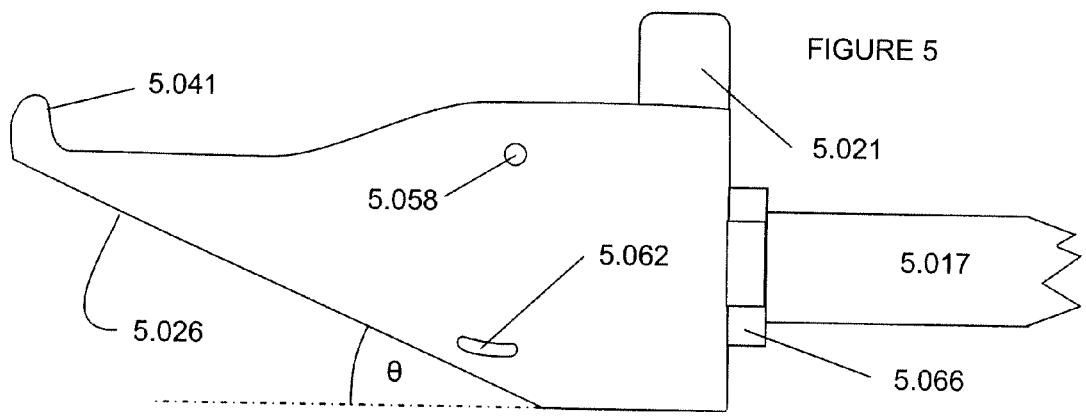
FIG. 5 is a side view of the fixed jaw.

A tie down guide is formed from a pair of projections 4.020, 4.021, on the gripping head, preferably remote from the sets of movable jaws as illustrated in FIGS. 4, 5 and 9. A base plate 4.019 can be provided to connect the guide projections 4.020, 4.021. The guide projections can be angled so their free ands diverge. In the case of a chain guide, the projections are sufficiently wide to prevent the free ends of the projections from being caught in a chain link. Similarly, the guide base plate 4.019 can serve to prevent the chain from catching on the edge of the base 4.056.

The base includes a shaft attachment and activation rod aperture to enable the hollow shaft 4.017 to be attached to the jaw assembly and to permit the operating rod 4.064 to pass through the aperture to be attached to the movable jaws at attachment hole 3.054. The distance between the pivot axes 3.046, 3.048 and the attachment aperture 3.054 provides leverage to enable the movable jaws to be operated by the lever 1.016. The shaft can be attached to base 4.056 by any suitable means, including a threaded attachment, swaging of the end of the shaft or other means.

The arms 4.037, 4.039 can have a tapered portion 4.026 adapted to facilitate the positioning of the angle protector 1.030, and subsequent withdrawal of the jaws.

The rod 4.064 can be spring loaded by a spring located either at the head between the aperture 4.066 and the attachment hole 3.054. Alternatively, the spring can be located at the handle and can be used to bias the lever 1.016.

The jaws 4.041, 4.043 can be spaced apart by a distance greater than the distance 3.044 of the movable jaws. In the present embodiment, the lower jaws 4.041, 4.043 are sufficiently wide to permit the movable jaws to fit between the lower jaws 4.041, 4.043 while the pivot axes 3.046, 3.048 extend into the pivot holes 4.058, 4.060.

In one embodiment, the base arms jaws and tie down guide of the lower jaw arrangement including the pivot holes, guide holes, and rod aperture can be formed integrally from a single piece of material by stamping and forming.

The spacing of the jaws can be adapted to accommodate angle protectors of different lengths. For example, at least the lower jaws can be adjustable to support longer angle protectors.

The axes 3.046, 3.048 can be formed by an independent axle rather than being integrally formed with the upper jaws and extend some distance beyond the edge of the upper jaws, and the guide pins can also be independent rather than integral with the upper jaws, so the lower jaws can be substantially wider than the upper jaws.

FIG. 5 shows a schematic side illustration of the fixed jaws. The pivot hole 5.058, the guide slot 5.062, the jaw 5.041, arm 5.037, and tie down guide 5.021 are shown. The angled portion 5.026 of the fixed jaws is inclined at an angle θ to the shaft 5.017. This enables the user to place the angled edge 4.026 approximately parallel to the upright side of the load 1.002. The angle θ can be of the order of 20° but is not critical, as the user can adjust the positioning of the placement tool to minimize the angle between the arm edge and the load to facilitate placement of the angle protector 1.030 and subsequent removal of the tool.

Figure 6:
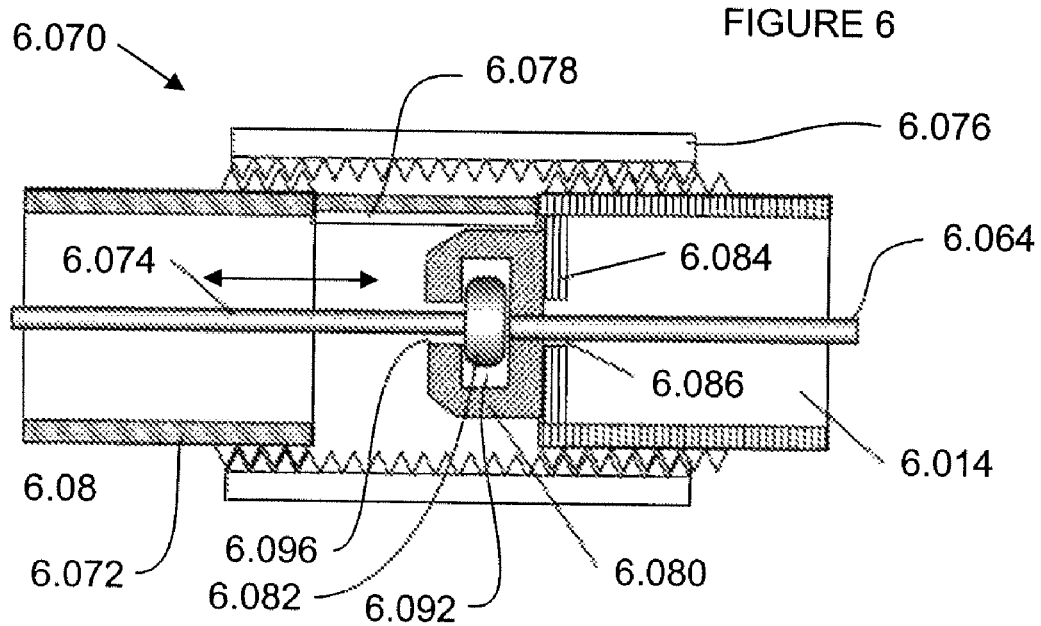
FIGS. 6, 7, & 8 illustrate details of an interchangeable handle arrangement.
Figure 7:
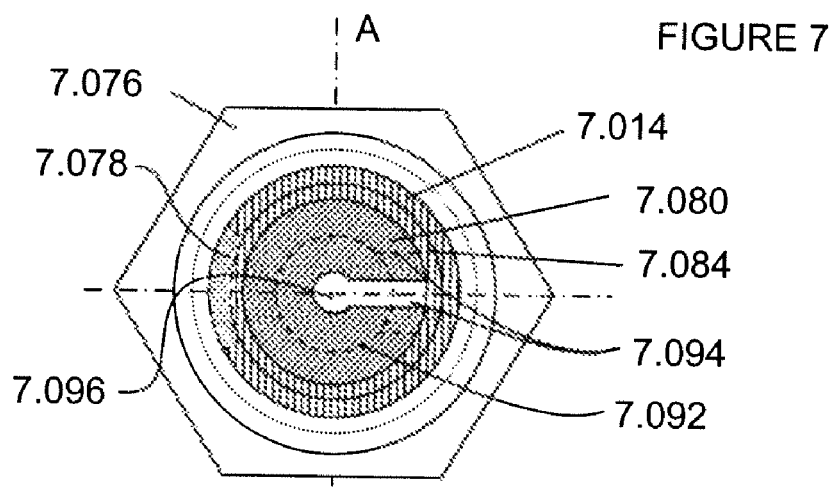
Figure 8:
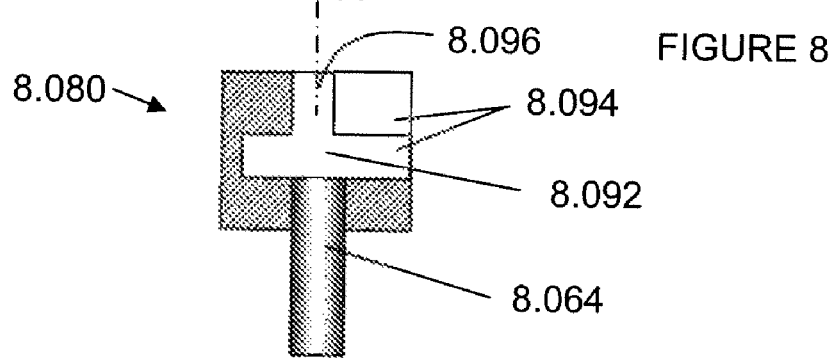

FIGS. 6, 7, & 8 illustrate detail of an interchangeable shaft attachment arrangement according to an embodiment of the invention. This arrangement makes it possible to change the length of the device by replacing the shaft with a shaft of a different length.

FIG. 6 illustrates the end of the shaft 6.014 and the end of the rod 6.064. The rod 6.064 terminates in a first attachment member 6.080. A stub shaft 6.072 is attached to the head (not shown), and houses a stub rod 6.074 of the activation rod terminating in a second attachment member 6.082. The first and second attachment members are adapted to be releasably connected to enable the shaft to be changed.

The shaft 6.014 can be closed by a ring or disc 6.084 having an aperture 6.086 through which rod 6.064 can freely pass.

The first attachment member can be a cavity 6.092 having an axial aperture 6.096 to permit the stub rod 6.074 to pass therethrough. A radial slot, 8.094, having an inverted "T" section is adapted to permit the boss 6.082 and the stub rod 6.074 to be inserted from the side. The second attachment member can be a terminating disc or boss 6.082 adapted to be received in cavity 6.082 via the side slot 8.094.

The shaft 6.014 and the stub 6.072 are externally threaded. A connector arrangement, such as the threaded nut 6.076 is adapted to engage the threads on the ends of the stub shaft 6.072 and the shaft 6.014 to hold the two parts in place.

A spacer member 6.078 is provided to hold the shaft 6.014 and the stub shaft 6.072 sufficiently apart to enable the disc 6.082 to be inserted into cavity 6.092 The rod can then be operated to control the jaws as indicated by the double headed arrow.

In this embodiment, the spacer 6.078 is a partial arc axial extension of the stub 6.072 which is designed to provide access between the first and second attachment members, as will be described below.

FIG. 7 is a schematic end view of the shaft. The hexagonal nut 7.076 is shown enclosing the shaft 7.017 and the closure ring 7.084. The slot 7.094 is shown in the first attachment member 7.080, which is basically a cylinder shape. The position of the spacer 7.078 is shown in dotted fill to indicate that it does not interfere with the insertion of the stub rod attachment member into the slot 7.094. However, as mentioned in relation to FIG. 6, the spacer can be part of the stub shaft, and is shown here for the purpose of illustrating that it does not obstruct the slot 7.094.

FIG. 8 is a section view of the first attachment member 7.080 along line A-A of FIG. 7. The cavity 8.092 is shown as being accessible from the side by the slot 8.094. The slot 8.094 is an inverted "T" to permit the boss 6.082 at the end of the stub to pass through the cross-bar of the "T" to enter the cavity 7.092, and to permit the stud rod to pass through the leg of the "T".

A similar shaft attachment arrangement can be provided at the other end of the shaft between the handle and the shaft so the interchangeable shafts can be attached to the handle.

Other connector arrangements, such as a bayonet coupling can be used to attach the shaft and the stub shaft without departing from the inventive concept. Similarly, alternative rod attachment means are within the inventive concept.

FIG. 9 illustrates a movable jaw according to an embodiment of the invention. The movable jaws are of one piece construction. The gripping arms 9.023, 9.025 have serrated gripping edges. A circular projection on each arm, such as 9.046 serves as an axle to engage a corresponding hole in the corresponding arm of the fixed jaws as shown at 10.060 in FIG. 10. The arms of the fixed jaws can flex to permit the axles of the movable jaws to be inserted in a snap fit manner.

Figure 11:
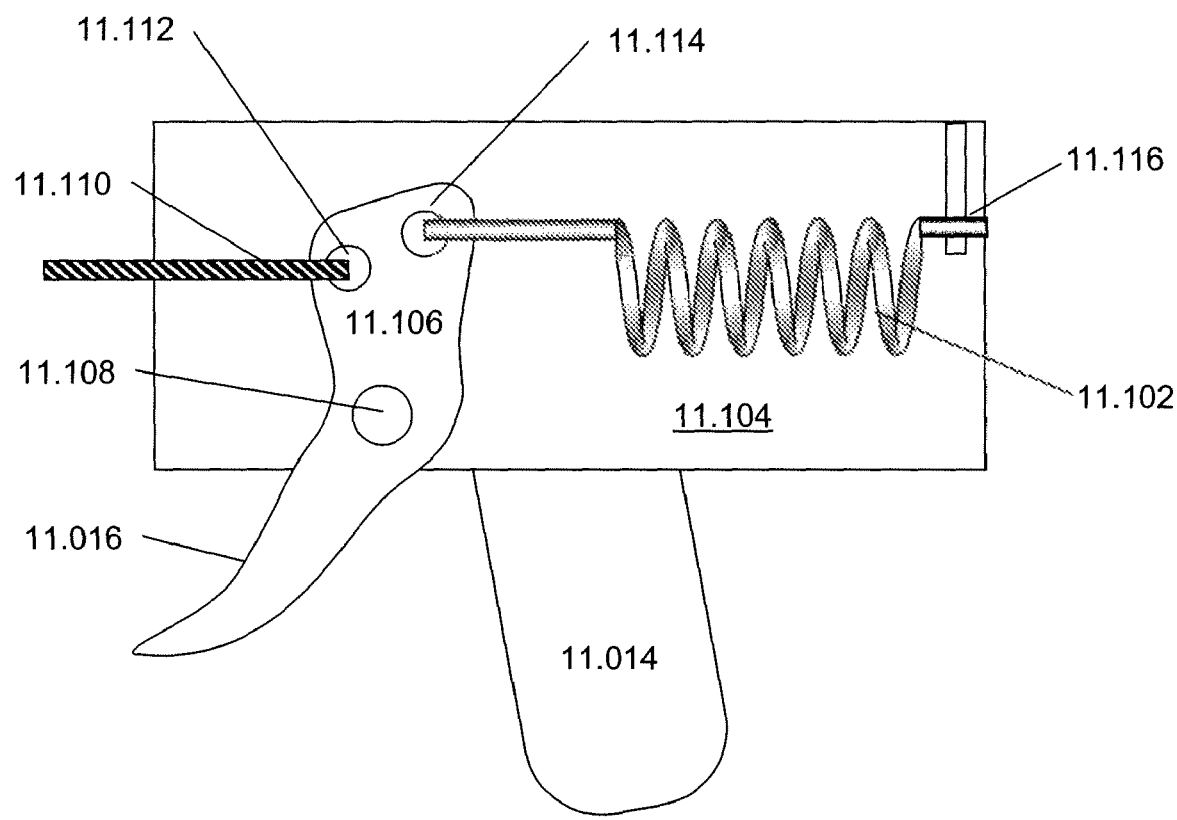
FIG. 11 illustrates a spring and lever arrangement according to an embodiment of the invention.

FIG. 11 illustrates an arrangement in which the jaws are held closed by spring 11.102. The operating trigger 11.016 is attached to housing 11.104 by pivot 11.108 and its operating lever 11.106 is connected to spring 11.102 at hole 11.114. The other end of the spring 11.102 is attached to the housing at 11.116. An operating cable 11.110 connects between the operating lever 11.106 and the connection aperture such as 9.054 of the movable jaws in FIG. 9. The spring is tensioned to hold the jaws closed with the required amount of force to enable a load protector and tie down to be located on the load. The spring tension can be released by the user squeezing the operating trigger 11.016.

Materials suitable for the manufacture of the tool include metal, plastics, or other suitable materials, or a combination thereof as will be apparent to a person skilled in the art.

A user can use the extension arm to place the two corner protector angles 1.030 on the edge of the load and to locate the tie down over the protectors while standing on the ground. In a first step, the user fastens a first end of the tie down 1.032 to the fastening rail 1.008, throws the free end of the tie down over the load, places the protector which is to be located on the fastened side of the tie down in the jaws and then places the protector in its required position while keeping the tie down in place by the use of the guides 1.020. The user then walks to the other side of the vehicle and takes hold of the free end of the tie down while placing the second protector angle in place and keeping the tie down in place between the guides 1.020. The user then releases the angle protector by releasing the lever 1.016. Then the user fastens the free end of the tie down, ensuring that the required tension is applied to the tie down to prevent the load from shifting during transport.

In this specification, reference to a document, disclosure, or other publication or use is not an admission that the document, disclosure, publication or use forms part of the common general knowledge of the skilled worker in the field of this invention at the priority date of this specification, unless otherwise stated.

In this specification, terms indicating orientation or direction, such as "up", "down", "vertical", "horizontal", "left", "right" "upright", "transverse" etc. are not intended to be absolute terms unless the context requires or indicates otherwise.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A tie down positioning, load securing extension arm including an angle protector gripping head, a shaft and a handle, wherein the head includes fixed and hinged sets of opposed jaws adapted to grip an angle protector, wherein the angle protector gripping head includes a tie down guide including a pair of projections and located on a portion of said angle protector gripping head remote from said fixed and hinged sets of opposed jaws which, in use, is adapted to facilitate placement of an angle protector and a tie down to secure a load.

2. A tie down positioning, load securing extension arm as claimed in claim 1, wherein the fixed and hinged sets of opposed jaws are spring biased jaws.

3. A tie down positioning, load securing extension arm as claimed in claim 1, wherein the handle includes an operating lever connected via an operating member to the jaws.

4. A tie down positioning, load securing extension arm as claimed in claim 1, wherein the fixed set of jaws has a first set of engagement elements, the first set of engagement elements being spaced apart transversely to the shaft.

5. A tie down positioning, load securing extension arm as claimed in claim 1, the hinged set of jaws includes a second set of engagement elements spaced apart transversely to the shaft.

6. A tie down positioning, load securing extension arm as claimed in claim 1, wherein one of the fixed and hinged set of opposed jaws is spring biased to close the first and second sets of jaws.

7. A tie down positioning, load securing extension arm as recited in claim 1, wherein said tie down guide includes projections which are angled such that ends of said projections diverge.

8. A tie down positioning, load securing extension arm as recited in claim 1, wherein the fixed and hinged sets of jaws are upper and lower sets of jaws, respectively.

9. A tie down positioning, load securing extension arm as claimed in claim 8, wherein an underside of the lower set of jaws is inclined to the shaft to facilitate removing the angle protector gripping head from the object or angle protector after an angle protector has been positioned.

* * * * *